United States Patent [19]
Terry

[11] Patent Number: 5,379,842
[45] Date of Patent: Jan. 10, 1995

[54] MATERIAL-HANDLING EQUIPMENT

[76] Inventor: Mel Terry, 1410 Dungeness Way, Sequim, Wash. 98382

[21] Appl. No.: 859,335

[22] Filed: Mar. 30, 1992

[51] Int. Cl.⁶ .............................................. B62D 5/02
[52] U.S. Cl. ...................................... 180/21; 180/23; 180/264
[58] Field of Search ............... 280/702, 709, 708, 111, 280/92; 180/22, 23, 24.03, 24.07, 264

[56] References Cited

U.S. PATENT DOCUMENTS

| | | | |
|---|---|---|---|
| 780,665 | 1/1905 | Kellogg | 180/264 |
| 988,287 | 3/1911 | Thorp | 180/264 |
| 1,125,184 | 1/1915 | Schleicher | 180/23 |
| 2,731,099 | 1/1956 | Schroeden | 280/111 |
| 2,790,650 | 4/1957 | Boschi | 280/711 |
| 3,246,906 | 4/1966 | Cahill | 280/708 |
| 3,280,931 | 10/1966 | Cahill et al. | 180/23 |
| 3,387,684 | 6/1968 | Belke et al. | 180/79.2 |
| 3,404,746 | 10/1968 | Slay | 180/23 |
| 3,572,458 | 3/1971 | Tax | 180/79.1 |
| 3,632,129 | 4/1972 | Bear | 280/140 |
| 3,773,348 | 11/1973 | Davis | 280/114 A |
| 3,792,745 | 2/1974 | Files | 180/9.46 |
| 3,903,979 | 9/1975 | Perrotin | 180/23 |
| 4,049,071 | 9/1977 | Stedman | 180/24.05 |
| 4,200,162 | 4/1980 | Tax | 180/23 |
| 4,372,407 | 2/1983 | McColl | 180/6.2 |
| 4,678,203 | 7/1987 | Rohner et al. | 280/707 |
| 4,702,843 | 10/1987 | Oswald et al. | 280/707 |
| 4,729,448 | 3/1988 | Sullivan | 180/161 |
| 4,872,702 | 10/1989 | Medley | 280/708 |
| 4,886,285 | 12/1989 | Horbach et al. | 280/43.14 |
| 4,934,733 | 6/1990 | Smith et al. | 280/711 |
| 5,016,912 | 5/1991 | Smith et al. | 280/711 |

Primary Examiner—Karin L. Tyson

[57] ABSTRACT

A multi-wheeled transport vehicle which is capable of crossing uneven terrain without torquing the load, including modular wheel units permitting a low profile and means to equalize the load between the individual wheel units.

6 Claims, 8 Drawing Sheets

MATERIAL-HANDLING EQUIPMENT

TECHNICAL FIELD

This invention relates to material-handling equipment and, more particularly to a material-handling system supported by a plurality of wheeled modules suspended in a manner that allows an extremely low profile. The wheeled modules are vertically extendable to selectively raise or lower the load as well as absorb vertical irregularities in the supporting surface while maintaining the load under uniform support. The wheeled modules are pivotable about a horizontal axis perpendicular to the axis of rotation to absorb other irregularities, such as sloping surfaces or the like. The wheeled modules are independently controlled and may be simultaneously steered by an interlinking control system to assure accurate transport without unnecessary side scrubbing. The irregularities of the supporting surface are absorbed and balanced by the interconnected wheel modules without unduly stressing the load, i.e. the load is maintained with a constant uniform support.

BACKGROUND OF THE INVENTION

The manufacture of extremely large and often delicate objects becomes difficult in that they must often be transported during manufacture as well as taken from the place of manufacture for inspection, modification and eventually for use. These objects often must be transported without overloading the wheels of the transporter from floor undulations or torquing or otherwise stressing the skin of the object. In the past, special equipment has been manufactured for this transport on an individual customized basis or, as an alternative, a special extremely smooth and level supporting floor or surface has been prepared, allowing the transportation by air bearings or the like. It becomes immediately obvious that the movement of devices upon specifically and individually constructed support vehicles as well as devices which require a specially prepared underlayment becomes extremely expensive and impractical for many types of industrial applications. A more universal approach is indicated.

Patented prior art known to the present inventor dealing with modular, wheeled steerable transporters for large objects includes U.S. Pat. No. 3,280,931 granted to Cahill et al, on Oct. 25, 1966, which discloses multi-wheeled module units which may be individually or as a group placed beneath a heavy load which need to be transported. The disclosure provides a means for synchronized steering of the various wheeled modules to assure tracking of the units.

U.S. Pat. No. 3,387,684 granted to Belke, on Jun. 11, 1968, discloses an apparatus for accurate tracking in a large vehicle having multiple wheel assemblies independently suspended from the vehicle hull or main frame. Individual wheel units may be raised or lowered.

U.S. Pat. No. 3,572,458 granted to Tax, on Mar. 30, 1971, discloses an all-wheel steering system for a multi-wheeled vehicle including cams which allow for a different turning angle for each wheel, required to prevent scrubbing.

U.S. Pat. No. 3,632,129 granted to Bear, on Jan. 4, 1972, discloses an axle assembly which prevents the lateral skidding of the tandem wheels. The wheels are mounted upon an elongated beam which allows the wheels to be selectively turned, and further includes a spring-loaded centering device urging the wheel sets to a tandem configuration.

U.S. Pat. No. 3,773,348 granted to Davis, on Nov. 20, 1973, discloses a vehicle suspension assembly including a shock absorbing suspension strut and a forward and rearwardly extending trunion which allow axial, radial and vertical movement of the wheels.

U.S. Pat. No. 3,792,745 granted to Files, on Feb. 19, 1974, discloses a vehicle having a frame and four individual traction carriages and power means for steering the carriages. Feedback controls coordinate the parallel positioning of the carriages as required.

U.S. Pat. No. 4,049,071 granted to Stedman, on Sep. 20, 1977, discloses a dual wheel suspension and drive arrangement for the main frame of a truck, wherein the forward end of a subframe is secured by a ball and socket and the rear end by a suspension cylinder. A pair of road wheels are rotatably mounted on either side of the side frame and driven by a common drive axle.

U.S. Pat. No. 4,200,162 granted to Tax, on Apr. 29, 1980, discloses a bridge portion for a traveling gantry wherein each corner of the platform is supported by at least one road wheel and steering devices permit the several wheels to be individually turned about their respective axes.

U.S. Pat. No. 4,372,406 granted to McColl, on Feb. 8, 1983, discloses a load-carrying vehicle having front and rear quad-wheel assemblies dually connected to a centrally disposed elongated bed frame, permitting lateral rotation of the assemblies about a roll axis disposed below and parallel to the longitudinal axis of the bed frame.

U.S. Pat. No. 4,417,634 granted to Quaeck, on Nov. 29, 1983, discloses an elevating transport vehicle carried by steerable idler bogies.

U.S. Pat. No. 4,678,203 granted to Rohner et al, Jul. 7, 1987, discloses an air spring including a sensitive control device to isolate vibrations, generated in the air spring, from the vehicle.

U.S. Pat. No. 4,702,842 granted to Oswald et al, on Oct. 27, 1987, discloses an all-terrain vehicle which includes a system for controlling vehicular functions; including providing hydraulic fluid to the hydraulic motor on one side of the vehicle independent of the hydraulic motor on the other side of the vehicle; controlling the vertical positions of the wheels on opposing sides of the vehicle, and others.

U.S. Pat. No. 4,729,448 granted to Sullivan, on Mar. 8, 1988, discloses a planetary drive axle including an offset trunion bracket, permitting the steering actuator to move in a horizontal plane while the axle oscillates in a vertical plane.

U.S. Pat. No. 4,872,702, granted to Medley, on Oct. 10, 1989, discloses a suspension system for high-capacity hauling vehicles including a gas/fluid system to self-level the vehicle, however the operator may manually override the feature to raise and lower the vehicle body.

U.S. Pat. No. 4,886,285 granted to Horbach et al, on Dec. 12, 1989, discloses a load-supporting plurality of transporter frames having wheels each of which is mounted for pivot at one end and at the other end by hydraulic cylinder and wherein all the hydraulic cylinders of that group are connected to one another and to a pump by means of a connecting line.

U.S. Pat. No. 4,934,733 granted to Smith et al, on Jun. 19, 1990, discloses a wheel suspension system utilizing a pivotally mounted wheel and hydraulic cylinder or air bag whereby the load floor of the vehicle may be located beneath the center line of the vehicle.

U.S. Pat. No. 5,016,912 granted to Smith et al, on May 21, 1991, deals with the same subject matter as U.S. Pat. No. 4,934,733 discussed herein above.

DISCLOSURE OF THE INVENTION

With the above-noted prior art in mind, it is an object of the present invention to provide a carrier for large and heavy loads wherein any unevenness of the supporting surface is absorbed in the carrier mechanism such that the object being carried is not subjected to bending or twisting stresses and the wheel sets are not being overloaded.

Yet a further object of the present invention is to provide a modular wheel unit wherein the unit is equipped to absorb vertical variations in the supporting surface by permitting limited vertical movement and likewise is pivotable about a horizontal axis, absorbing differences in elevation in the supporting surface between the wheels of a dual wheel set.

Yet a further object of the present invention is to provide a piston and cylinder system serving both as a means to absorb surface variations of the supporting surface and to provide lift for a load supporting vehicle while being capable of providing turning torque to the surface-contacting wheel units.

Yet a further object of the present invention is to provide a choice of suspension fluid combinations that can be employed for specific results; i.e., a compressible fluid, a compressible fluid reacting with non-compressible fluid, and an equalizing conduit system for equalizing loads between several cylinders using only a non-compressible fluid.

Still a further object of the present invention is to provide a wheel unit for use in a load carrying transport system, wherein the units are of a standard construction and may be used in a variety of combinations and/or patterns.

Yet another object of the present invention is to provide a transporter with an extremely low profile permitting it to more readily operate within the existing building structures.

Still a further object of the present invention is to provide a suspension system for a heavy carrier wherein the cylinder of the adjustable system provides a base for the axle of the supporting wheel unit and the piston is secured to the frame allowing a much lower profile.

Yet a further object of the present invention is to provide wheel units that can communicate with a computer controlled steering system that allows large numbers of wheel sets to travel in complete harmony without unnecessary scrubbing.

Yet a further object of the present invention is to provide driven wheel sets that can communicate with the same computer controller which controls the steering system to regulate drive speeds and/or torque for uniform and equalized travel capability.

Yet a further object of the present invention is to provide a modular design wheel set system in which the same size and design of the wheel set can accommodate a wide variety of applications.

Yet a further object of the present invention is to provide a wheel set suspension cylinder that is inverted to provide a lower profile than is possible with conventional cylinder design.

Yet a further object of the present invention is to provide a wheel set that has the wheels surrounding and attached to the cylinder by lateral articulating means, wherein the wheels thus attached to said cylinder remain firm on the floor while a center-line mounted, non-rotational piston travels vertically to accommodate uneven surfaces and transmits steering torque to the wheels which rotate about a true center of each wheel set.

Yet a further object of the present invention is to provide a wheel set which, when the piston is at the bottom of its stroke, provides an overall module height only slightly greater than the diameter of the wheel, yet provides an exceptionally high lifting stroke when compared to any other design.

Yet a further object of the present invention is to provide a near identical design compressible fluid suspension, heavy capacity, caster wheel set unit which can be totally independent of other caster units and which can be used with a towing vehicle and which does not require a computer steering input for its normal functions. The caster unit is capable of offset rotation for trailing motion functions, but can be made to rotate about the true center line of the wheels for radical turning applications, such as reversing direction to exit laterally restrained docking position.

Yet a further object of the present invention is to provide a compressible fluid suspension, heavy capacity, caster wheel set unit which can be used in numbers from four or more than a dozen and still provide fully independent equalized loading and still provide a means of not causing damaging scrubbing to the floor and wheels, or common and disruptive "caster kick" when initiating lateral or reverse travel from a standing position.

Yet a further object of the present invention is to provide a pre-charged suspension system which can be used as an energy absorption system for lowering heavy loads onto a transporter or trailer by crane or other means, wherein said pre-charge is set for all or a significant portion of the anticipated load, or is set for the maximum capacity of the wheel set and will allow the wheel set to compress under the shock-loading condition imposed by decelerating a lowering inertial mass.

It is another object of the present invention to provide a compact multi-unit accumulator for a transport system such that any uneven loading from the respective wheel units of the carrier are absorbed and balanced by the other wheel units.

Still another object of the present invention is to provide an accumulator for use with a multi-load system such that the loads from several units may be accumulated and balanced in a small compact unit.

Yet a further object of the present invention is to provide a modular wheel unit for use in transporting large and heavy objects wherein there are variations in the unit, i.e. a caster unit, a driven unit, or a caster unit alternatively in combination with a steering unit. All of the wheel units include the inherent ability to absorb unevenness in the supporting surface and not transmit any torque to the load.

BEST MODE FOR CARRYING OUT THE INVENTION

Figure 1:
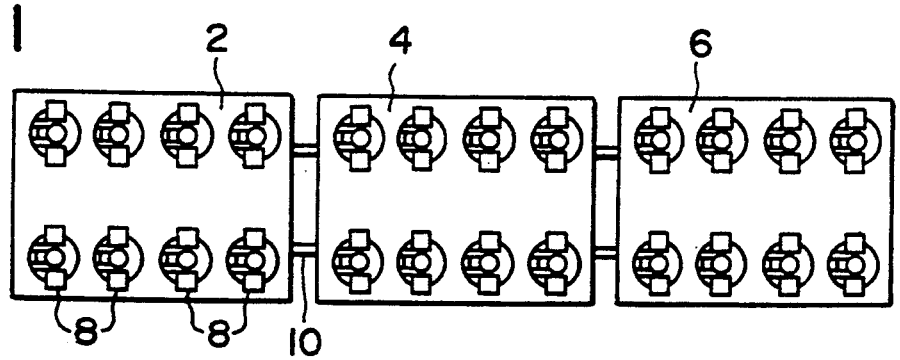
FIG. 1 is a bottom plan view of a transport unit comprising three modules, each module being supported by a plurality of inventive wheel units.

Reference is now had to the drawings where in FIG. 1, a plurality of transport units 2, 4 and 6 are shown, each of which units has a plurality of wheel-support modules 8 and are spaced apart by elements 10 which establishes the geometry information for the computer's control of the multiple transport units as a single transport unit. In applications where a plurality of transport units may be employed, structures being carried may require specific support for different parts of the load. In such cases otherwise independent transporters can be located directly under the load points and the position, center-to-center distance, and orientation of the transporters can be communicated to any one of the individual transporter's computers that may be chosen as the "master computer". The computers on the other transporters become support units or secondary control, reacting to a centralized command.

The present invention provides a wheel system that will allow multiple sets of otherwise independent transporters to be located virtually anywhere, under any shape of load, provided a means to position each transporter can be fixed and/or communicated to the controlling computer steering system to allow the computer's accurate computation of geometry and speed commands for all travel functions. As will be explained in a later section, a plurality of transporters used separately under a single load may require additional sensing equipment to assure very precise tracking.

As will be readily perceived, to accomplish a smooth movement of the three or more modules without twisting the load, each of the wheel units must be capable of either following without creating drag, or in the alternative, be electronically coordinated such that synchronized steering occurs. Likewise, as will be obvious, some of the wheel units would preferably be motorized, providing a motivation for the entire unit; further some of them would have braking capability and, as explained hereinafter, the units should have the ability to raise and lower the load, i.e. drive under and lift or lower and drive out, while at the same time absorbing any unevenness in the supporting surface without putting significantly greater stress on the transported object regardless of floor undulation. With the exception of these tasks and specific variations the wheel units are essentially identical.

Figure 2:
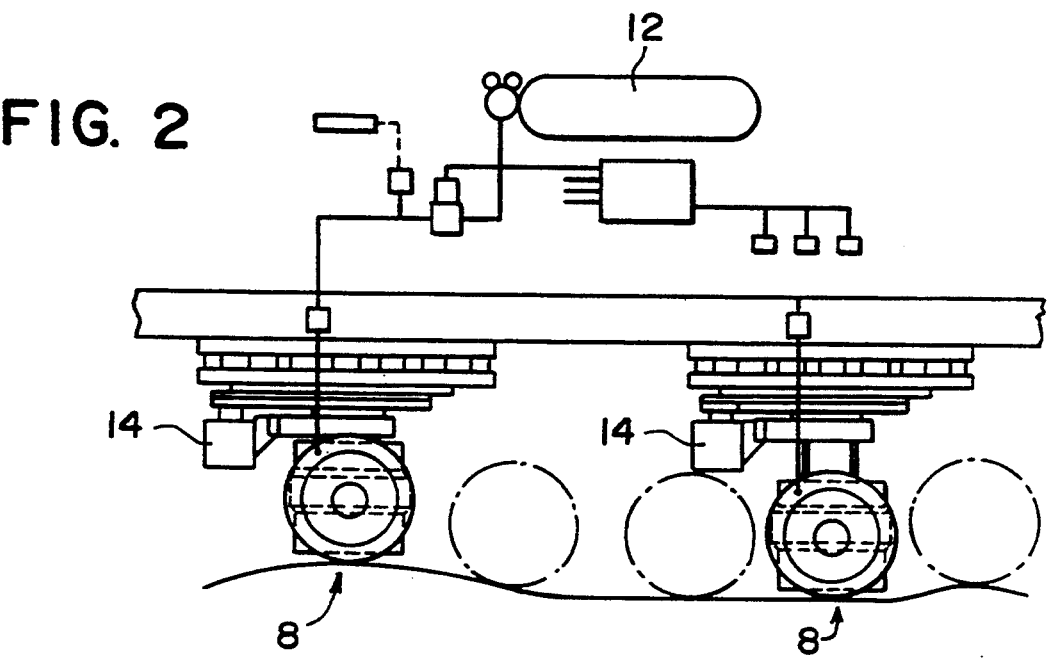
FIG. 2 is a side elevation view showing two modular wheel units supporting a transport device which in turn carries a nitrogen cylinder and controls.

As seen in FIG. 2, a pair of adjacent wheel sets which must be able to move vertically (see FIGS. 4 and 8) are shown and it is to be understood, as explained hereinafter, one or more nitrogen cylinders 12 would keep the suspension systems charged by keeping fluid under variable pressures at the wheel cylinder, allowing it to undulate under load while likewise permitting the entire load to be raised or lowered when desired. Adequate controls such as transducers, regulators and load cells may be appropriately located to control the system. Likewise seen in this view, at each of the wheel sets, and explained in greater detail hereinafter, are individual motors 14 to control the angular position of the individual wheel sets 8. In particular, the steering system constantly monitors the wheel positions and proportional travel speed through reading the signal from high precision encoders in the steering and tracking drive modules. Each wheel set (two or more axles and trunion mounted wheels) has a power-rotate mechanism that matches the wheel-travel direction to every other wheel set under the transporter through all of the steering maneuvers of any travel sequence. The functions are essentially the same for power driven as for slave or other wheel sets.

Figure 4:
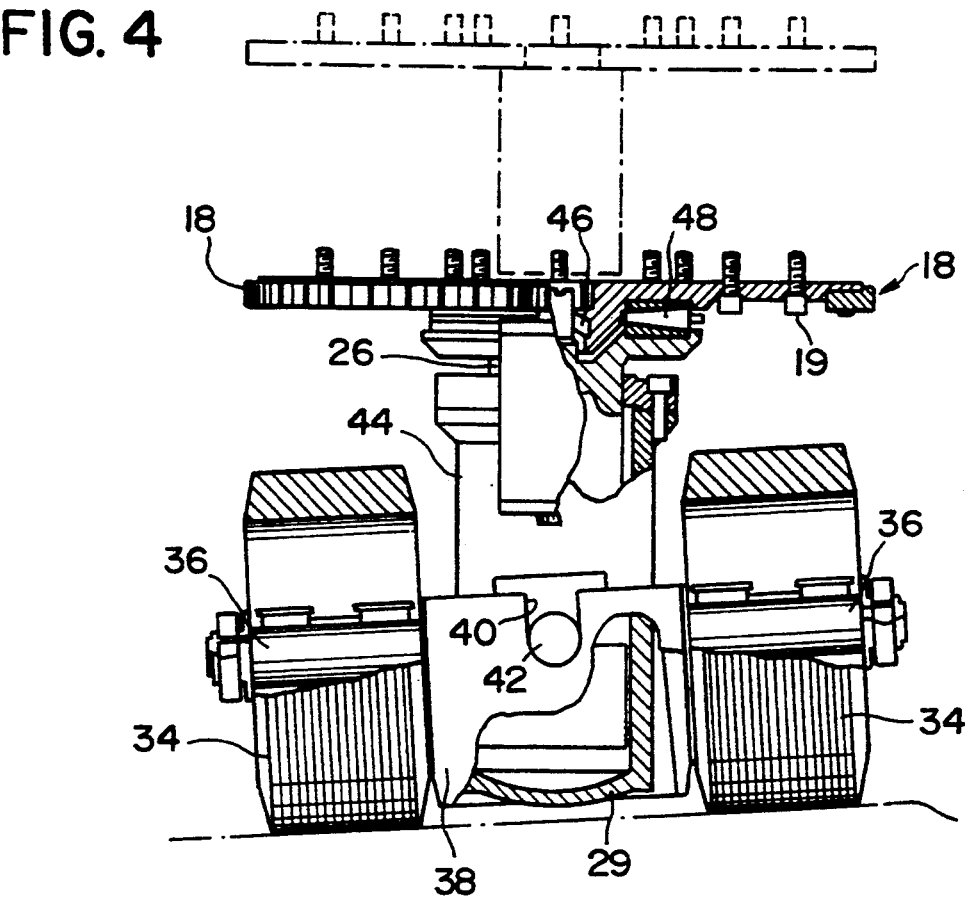
FIG. 4 is a front elevational view depicting how the wheel module serves to absorb unevenness in a direction along the axle of the wheel. This illustration utilizes a long cylinder.
Figure 5:
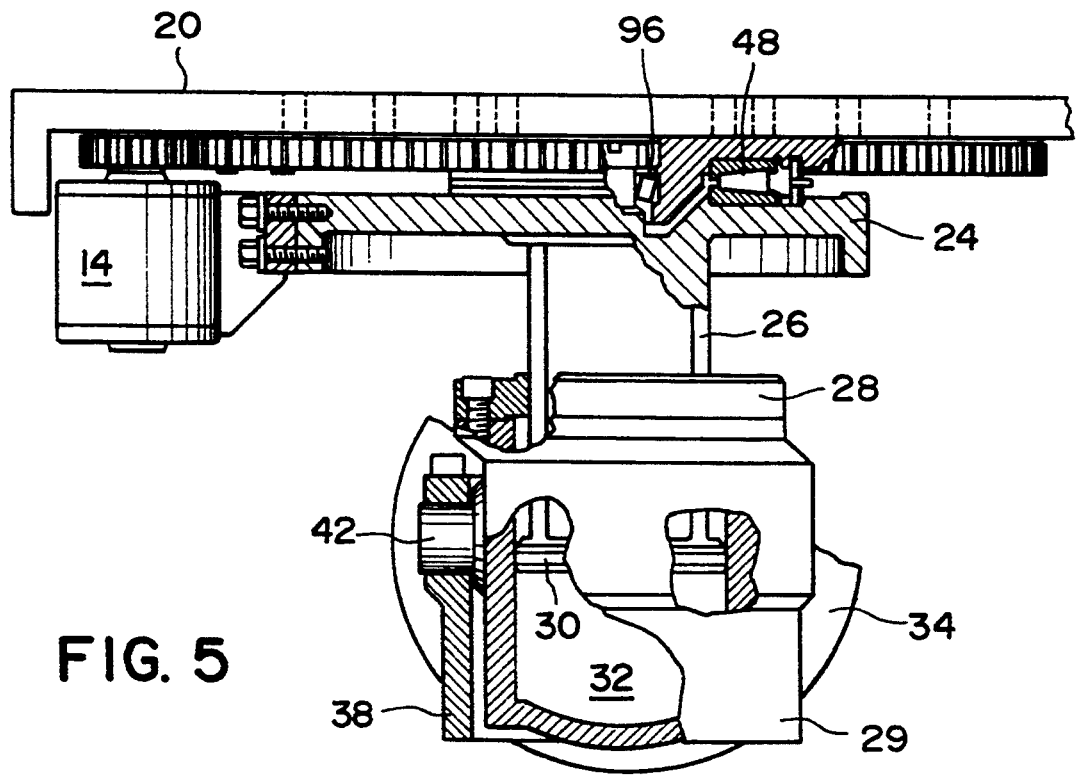
FIG. 5 is a side elevation of the wheel module in an upwardly extended position.

Reference is now had to FIG. 4 and 5 wherein a pair of wheels 34 are mounted to axles 36 which form a relatively fixed part of wheel truck 38 which includes a yoke portion 40. Trunions 42, which are mounted on the sides of the bottom casing 44 which houses piston 30 secured to an irregular upper shaft 26 which transmits the torque from the plate 24, pivotably rest in yoke 40. It is to be noted that there are radial bearings 46 and thrust bearings 48 to accommodate the load and relative rotational movement. Further to be noted in this view is ring gear 18 secured to plate 19 which is in turn bolted to a portion of the frame (see FIG. 5A). Ring gear 18 could be a segment in some applications.

The utilization of the cylinder housing 29 as the support for trunions 42 to pivotably support assembly 38 carrying axles 36 and having piston rod 26 extend upwardly therefrom permits the entire vehicle to have a lower profile.

The piston head 30 (see FIG. 5) includes the appropriate seals and fluid interconnection such that fluid under pressure entering chamber 32 controls the location of the piston 30 and thus the amount of extension or contraction of the shaft 26 and thus the placement of the entire load with respect to the wheel set.

The transporter suspension system is designed to accommodate three basic types of equalizing suspension. One type of suspension is by a compressible fluid, such as nitrogen gas or air. From a practical standpoint, nitrogen is the fluid of choice as being a most accessible and inexpensive compressible fluid for this purpose.

Applications with compressible fluid are ideally suited for passive, non-intelligent control, such as caster systems used for trailers, tooling structures, specialty stands and the like. These types of systems would normally be pressurized for a specific application and have a simple small pressurized nitrogen cylinder with a regulator preset to the desired pressure for the loading condition.

A typical benefit of this type of equalizing suspension would be for loading applications and it would be practical for the transporter, trailer, or mobile platform on which the wheel sets are mounted, to act as a shock absorber to accept normal overloading provided by the deceleration forces encountered when lowering a heavy mass.

For self-loading systems, such as for transporters designed to drive under compatible slave pallets or elevated platforms, compressible gas systems require exhale, sting gas to atmosphere when lowering a heavy load. These systems may better be accommodated by use of a second type of equalizing suspension comprising non-compressible fluid in the cylinders reacting with a compressible gas in an accompanying fluid accumulator vessel which separates the two types of fluid with a bulbous rubber diaphragm, thus providing the obvious advantage of better flow control for uniform lifting and lowering operations and more efficient consumption of the compressible fluid.

The present invention also will accommodate a third type of suspension system including a fully non-compressible fluid system as used in many of the referenced prior art applications. A system of interconnecting piping can allow fluid from adjacent wheel sets to exchange as needed to accommodate undulations in the operating surface during travel; however, this arrangement does allow groups of wheel sets to be severely overloaded during some situations such as loads being lowered by crane.

Figure 12:
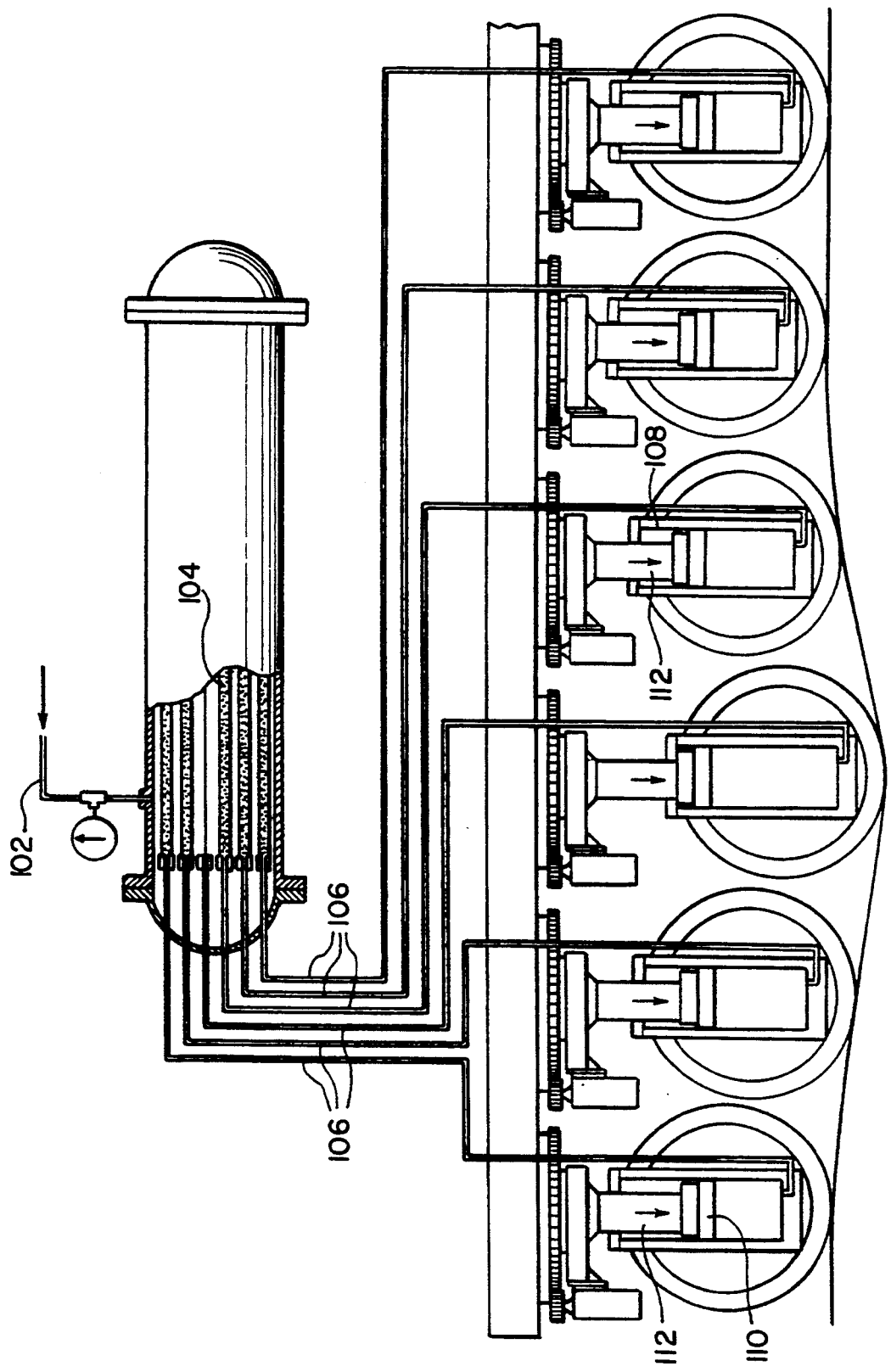
FIG. 12 is a schematic side elevation depicting the reaction to a depression.

The preferred system comprises a suspension system wherein each wheel set has a nitrogen-charged cylinder that provides a predetermined vertical stroke. The nitrogen charge causes the cylinders to react as a jack to lift or lower the loaded transporter. If the nitrogen pressure is slightly less than the required lift, all of the pistons will be at the bottom of their stroke and ready to lift if some variation in the floor surface would cause certain wheel sets in the system to incur more load and others less. The wheel sets incurring more load would be on slight rises in the floor and would incur a slight increase in loading and thus remain at the bottom of their piston stroke, whereas other wheel sets would sense a slight decrease in loading and begin to extend and automatically maintain the load condition. If the uplift nitrogen pressure is slightly more than the load, then all the pistons react to raise the entire load hard against the top of the piston strokes. In this situation, wheel sets on a slight rise would begin to overpressure and compress, whereas the other wheel sets would see decreased loading and would remain fully extended (see FIG. 12).

Figure 3:
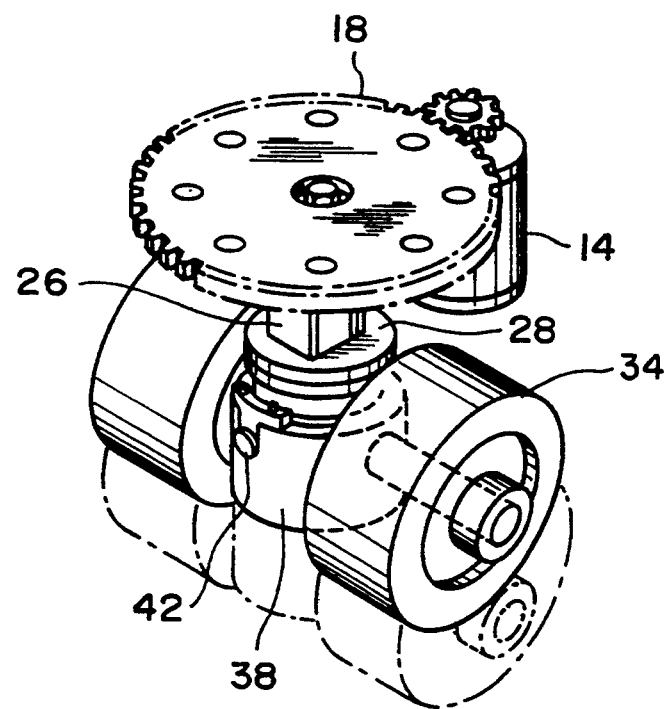
FIG. 3 is an isometric view of one of the wheel modules.

Reference is now had to FIG. 3 wherein the range of motion of the individual wheel set may be seen. Likewise to be seen in this view is a drive motor 14 having mounted thereon a pinion gear 16 in mesh with a ring gear 18 which is bolted to a circular plate as explained hereinafter. Driver motor 14 (see FIG. 5) is bolted to a piston top plate 24 to which is secured a square machined upper shaft 26 to transmit the torque from the top plate to the wheel set via a square torque plate upper flange 28 which is sectional so that it may be removed. It is to be understood that the preferred configuration of shaft 56 is square in cross section, but that any non-circular cross section or keyed shaft will perform similarly and transmit torque to the wheels for steering.

Figure 6:
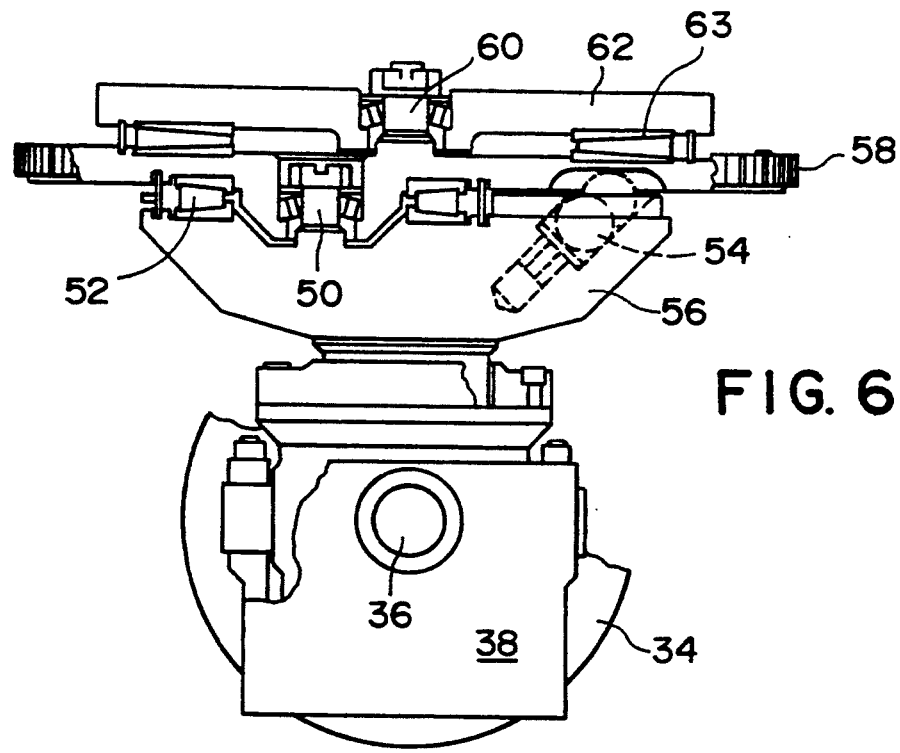
FIG. 6 is a side elevation of a wheel module in the caster configuration.
Figure 7:
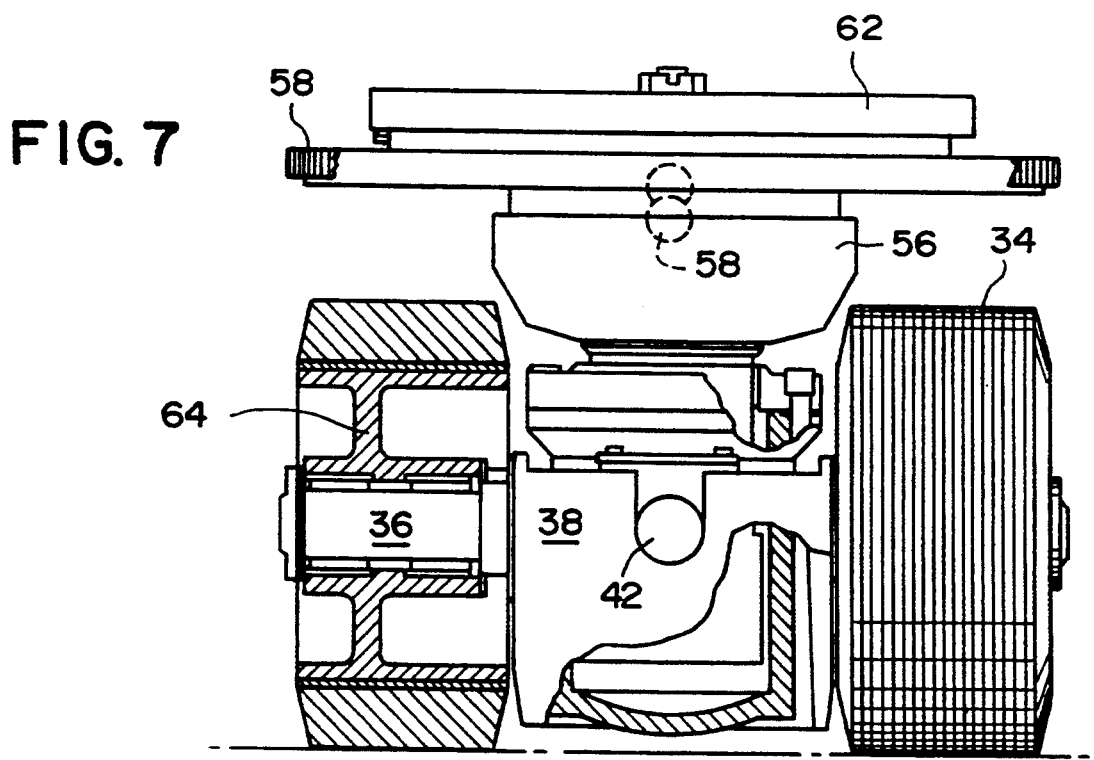
FIG. 7 is a front elevation of the module of FIG. 6.

Reference is now had to FIGS. 6 and 7, wherein a dual function caster wheel is shown. The lower portion of the module of the caster is identical to the other modules. However, the caster rotates about a vertical axis through shaft 50 which is offset from the center axis of the wheel set and is a trailing wheel when operating as a caster, utilizing bearings 52. When it is necessary to make a radical direction change, it is possible for the wheel unit to rotate about the vertical center axis of the wheel. For this maneuvering, hydraulically, electrically or mechanically actuated ball 54 locks the lower unit 56 to the gear 58 which is then capable of being rotated about vertical axis 60 passing through plate 62 and utilizing bearings 63. It is to be noted that the wheels 34 in this particular embodiment are supported by hubs 64 mounted for rotation about axle 36.

The present invention provides a wheel suspension design in which the wheel truck 38 attaches pivotally to trunion shafts mounted high on the sides of center lifting cylinder, allowing said cylinder to operate in an upside down configuration and opposite to the conventional utilitzation. In this configuration, the bottom of said cylinder is very near the floor, allowing far greater available vertical clearance. Instead of the piston rod mounting to the wheels, the piston rod attaches with a vertically rigidly, but rotatable connection to the upper structure. This connection comprises of shafts, rotatable bearings and thrust bearings, thereby providing a non-flexing rotational connection about the true vertical axis. This design allows the overall height of the rotating wheel set to be only slightly higher than the actual diameter of the wheel, yet provides an exceptionally high lifting stroke capability.

For applications requiring higher lift, the length of the cylinder 44 can be extended (as shown in FIG. 4), thereby providing higher lift, but also proportionately increasing the lowered height of the transporter.

Figure 5A:
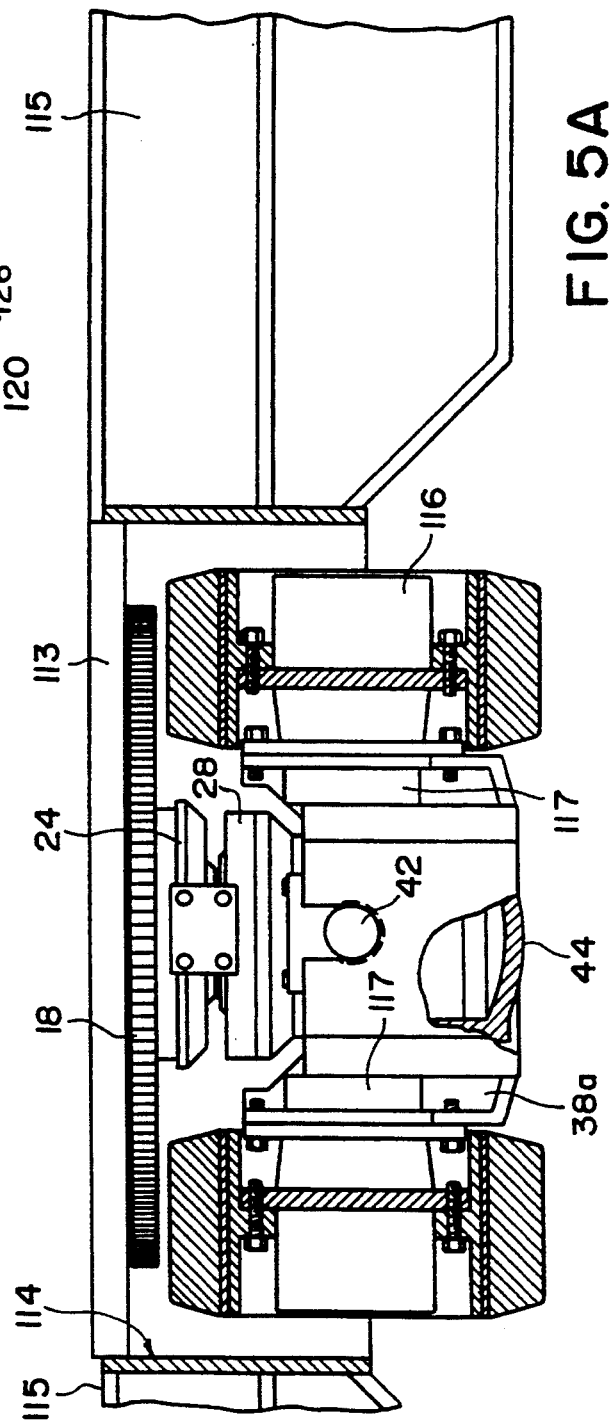
FIG. 5A is a front elevational view of a driven wheel module.

Reference is now had to FIG. 5A, wherein driver module is shown. The equalizing truck 38A, being pivotally mounted to cylinder trunions 42, provides the mounting for the geared "torque hubs" 116 and their internally mounted hydraulic drive motors 117.

The hydraulic circuit for the drives accommodate the differential torque requirements for turning functions. It is to be noted that the variable torque to these opposed drives are, or may be, utilized for steering functions to assist rotational drive motor 14. Currently, commercially available "torque hubs" have the built-in brakes as well as precision encoders. Of which, the latter are needed to communicate data to and from the system's computer controller. Precision encoders are also mounted in the rotational drive motors 14.

To enhance the very low profile design, the wheel set modules also include mating structural components that further become part of each wheel set module. The structural portion of the module consists of a round, heavy and rigid top mounting plate 113, to which is welded a relatively thick skirt which is rolled around and protrudes downwardly to encapsulate the entire rotating wheel set. The wheel set ring gear 18 bolts directly to the mounting plate 113. This structural design forms a very rigid, high strength inverted "structural can" that provides a non-bending cross-section of sufficient structural strength to accommodate the most severe operating condition. For multiple wheel set applications, the structural "cans" are welded together directly, or through structural members, such as I-beams 115 of any desirable strength and to as much as near the entire depth from the top of the mounting plate 113 to the floor, and are arranged to space the modular wheel sets to any desired distance apart and desired rigidity without adding to the overall height of the transporter. Identical sized modules can be used for both the driven and non-driven wheel sets.

It is to be understood that if a particular application requires suspension and steering, but does not require an extremely low profile, then the ring gear portion 18 of the wheel set module can bolt directly to conventionally designed structures.

The present invention provides a combined steering and suspension system that can allow random path radiused steering as well as lateral, oblique, and rotational travel. The complexity of coordinating all of the requirements needed to meet those operating conditions may effectively be handled by a computer control capability, capable of processing vast quantities of input data and through "look-up" and table type commands, or like functions, be able to continually update the computed data thousands of times per minute.

Many current and past technology heavy load systems utilize hydraulic and mechanical proportional control systems; however, this transporter system would primarily use computer control technology.

Figure 8:
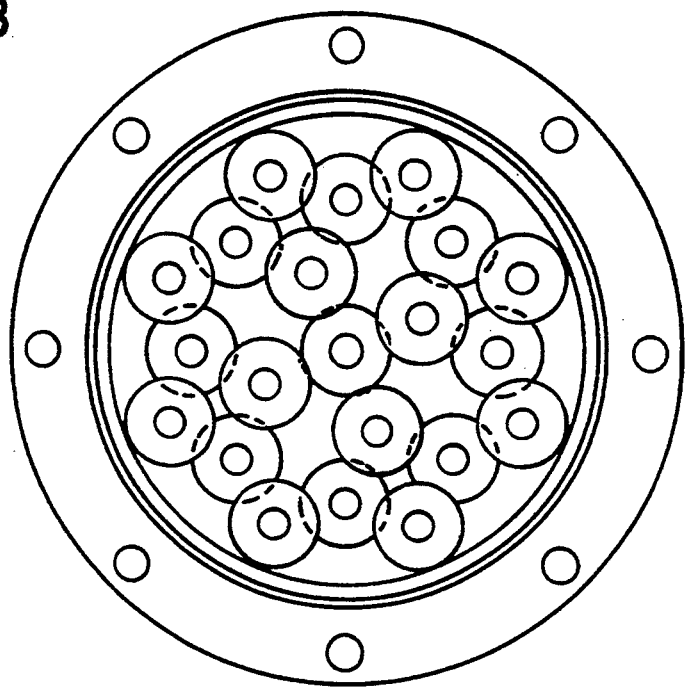
FIG. 8 is a vertical sectional view through a multi-unit accumulator.
Figure 9:
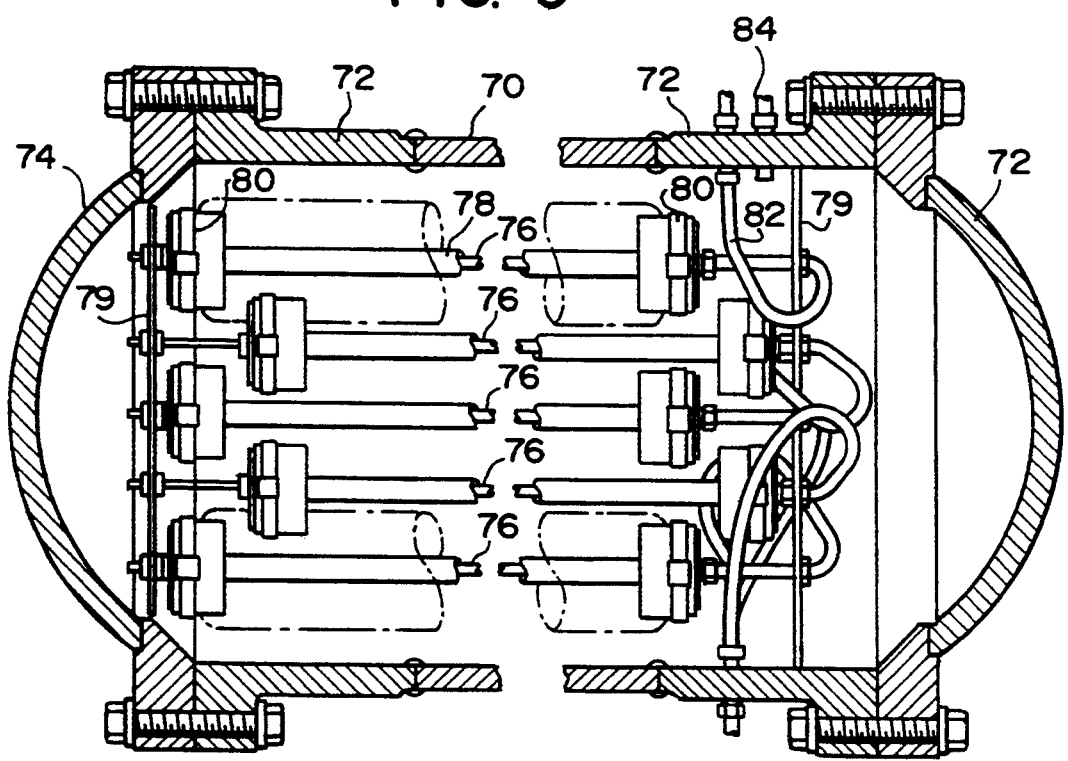
FIG. 9 is a side elevation view of the multi-unit accumulator of FIG. 8.

For a fluid suspension system using a combination of compressible and non-compressible fluid, an accumulator suitable for use with the aforementioned transport device and capable of handling the fluid for the wheel sets as described, is shown in FIG. 8 and 9. In particular, and as described hereinafter, the accumulator comprises a large rigid pressure vessel having a plurality of smaller elastomeric pressure vessels sealed within such that the liquid, preferably hydraulic oil, within the smaller vessels reacts against the compressible fluid, preferably nitrogen, in the exterior vessel, providing a balancing function and assuring that all of the load sources, in this case wheel sets, are at substantially equal pressure. Generally speaking, the suspension system is designed to generate either at the bottom (under-pressured) or at the top (over-pressured) of the piston stroke. Only variations in the floor will cause the piston to be partially extended or compressed.

In particular, the vessel comprises a metal cylindrical main body portion 70 having a flange 72 welded to each end thereof and a bolt-on flanged head is secured to each end of the entire structure. A plurality of small diameter pipes 76 are secured within the vessel by mounting plates 79. The pipes 76 each include a plurality of openings through the circumference thereof and are surrounded by elastomeric tubes 78 or the like secured to end caps 80. A conduit 82 extends from one of the end caps 80 of each of the units to an individual wheel set fluid cylinder. An opening for gas under pressure, such as nitrogen, is formed in the side the unit as at 84. Since the vessel is pressurized, i.e. at 450 p.s.i., the elastomeric tubes are normally squeezed flat against the metal tube 76. The fluid within the expandable chamber would be oil or some other non-compressible fluid. One or more of the accumulator's multiple tubes may see a small exchange of oil as any of the individual wheel sets engage a rise or depression in the floor surface. With the proper load settings, generally not more than one-fourth of the accumulator tubes will be seeing any significant internal pressurization. Provided the transport device is handling a reasonably balanced load, one multi-accumulator is required for the loaded high-pressure circuit and one for the unloaded unpressured circuit or a single multi-accumulator may be used by increasing or decreasing the gas pressure.

Figure 10:
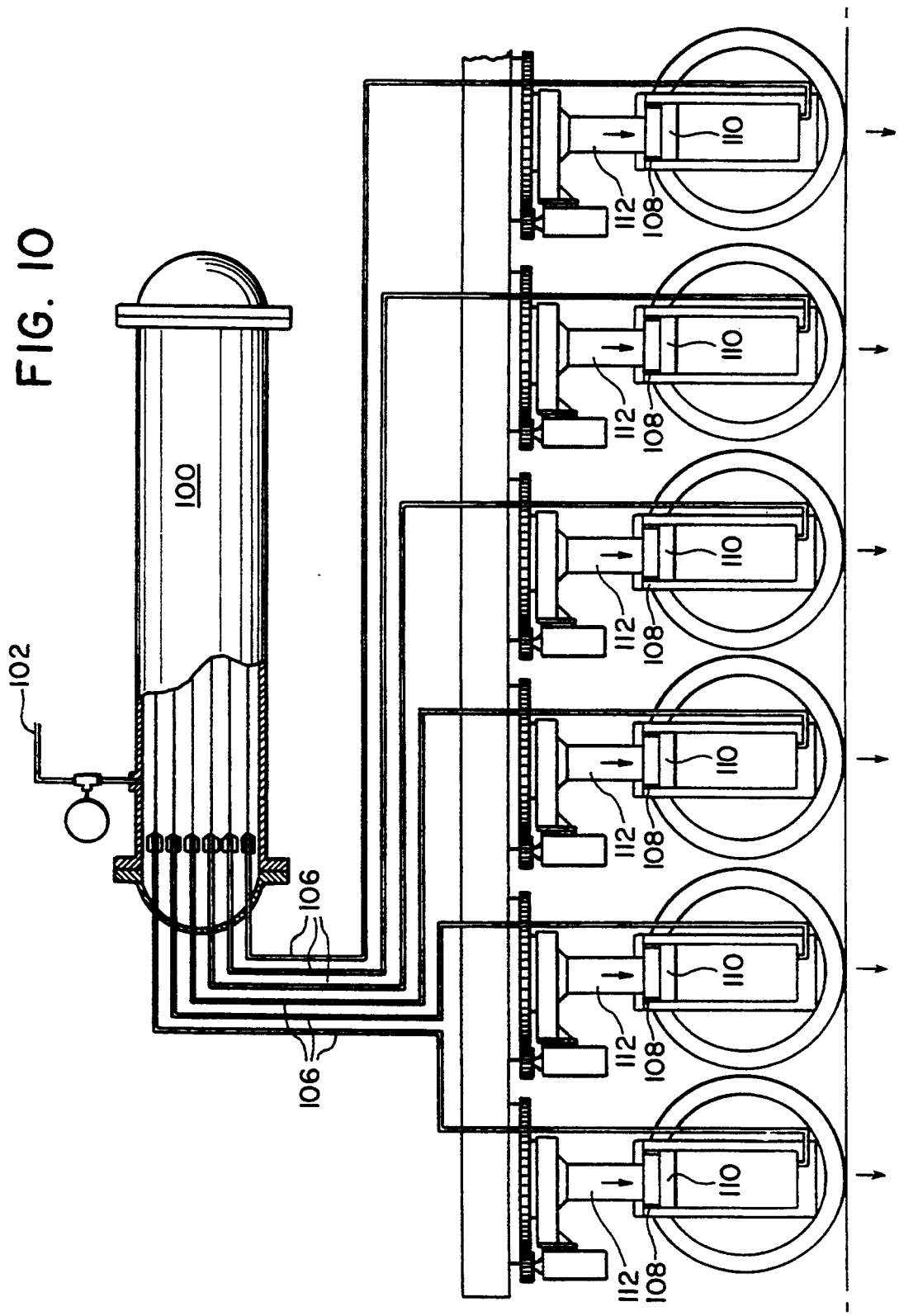
FIG. 10 is a schematic side elevation of the inventive accumulator wherein the wheel units are supported on a level even surface.
Figure 11:
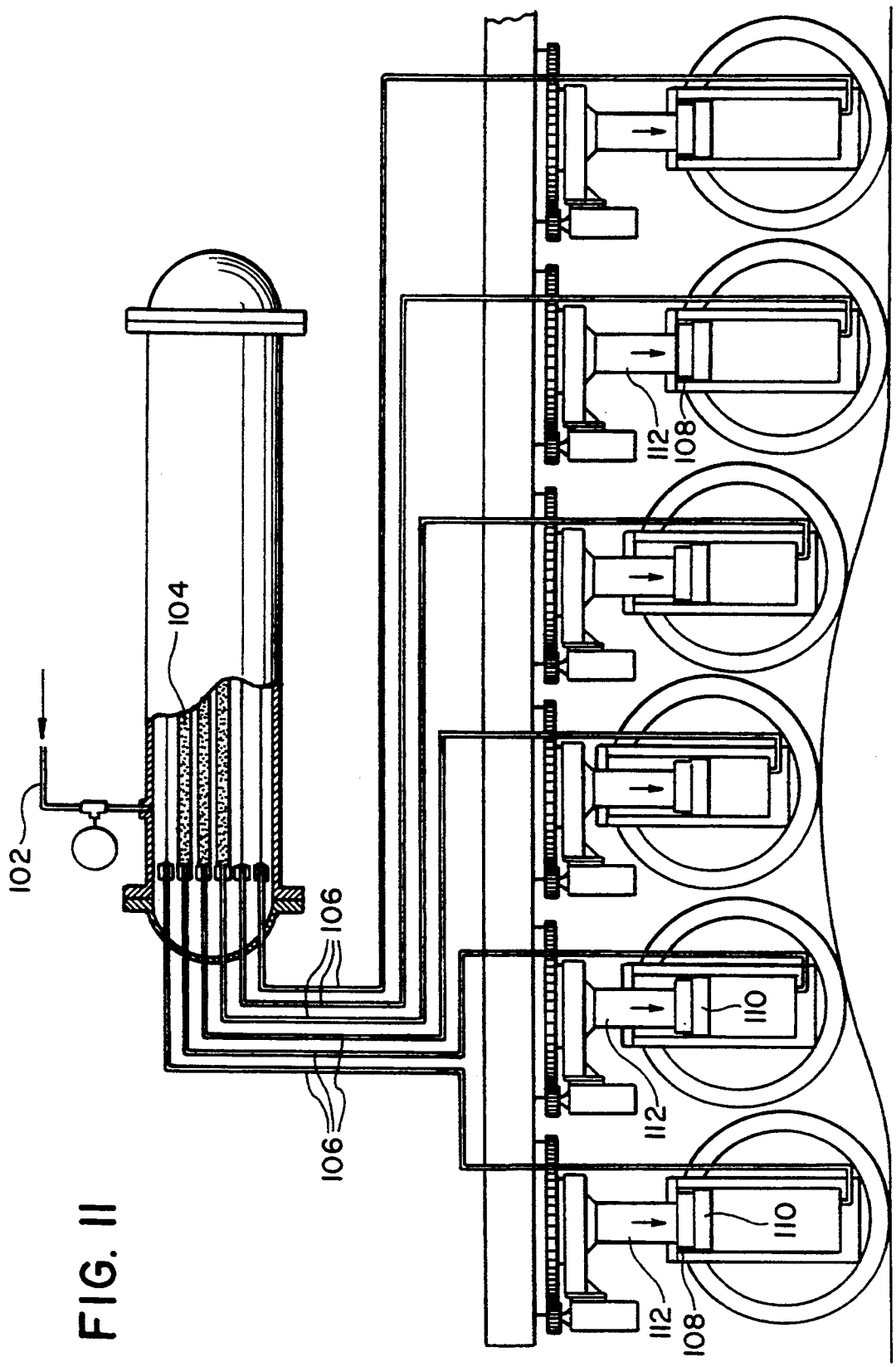
FIG. 11 is a schematic side elevation of the inventive accumulator wherein the wheel units are supported upon an uneven surface.

Reference is now had to FIGS. 10 and 11 wherein the specific combination of the wheel modules utilizing a gas/liquid combination in conjunction with the accumulator can best be seen. In these figures, the multi-cell accumulator 100 is shown interconnected with a source of nitrogen under pressure and further shows a plurality of elastomeric interior tubes 104 which, as noted herein above in the preferred embodiment, surround a perforated interior rigid tube. Each of the tubes 104 is connected to a conduit 106 which leads to an individual wheel unit cylinder 108, including an interior piston 110 having a non-circular shaft 112. As the supporting surface changes, one or more wheel set are vertically displaced, causing fluid to flow to the accumulator 100 while maintaining an even weight distribution upon the wheel sets. The displaced fluid is contained in the attached elastomeric tube surrounded by pressurized gas at the same pressure as the other tubes. The multi-accumulator dramatically reduces the space that would be required for individual accumulators for each wheel set and provides an energy-efficient suspension means.

Figure 14:
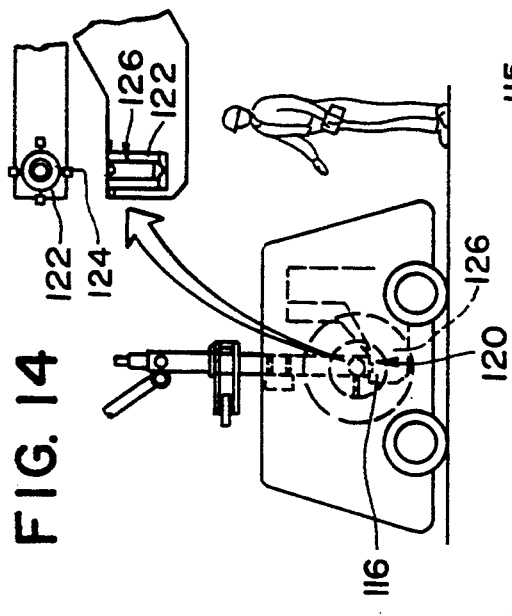
FIG. 14 is an illustration of one method to transporting an airplane without generating side load.
Figure 13:
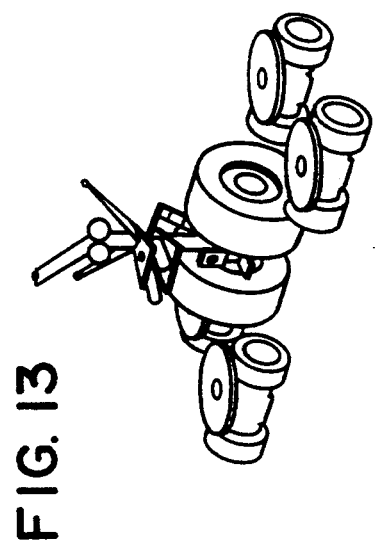
FIG. 13 is a pictorial representation wherein the modules are used to transport an airplane nose wheel.

As referred to in prior text, there will be applications requiring a plurality of transporters where the transporters are separated by considerable distance, and it is required that the position of each of the transporter's driven and non-driven wheel sets be known to the controlling computer. Now referring to the drawings, FIGS. 13 and 14, one such application is that of moving airplanes in an airplane manufacturing facility. The inherent capability of the wheel sets to lift a load a substantial distance vertically makes this modular wheel system ideal for applications where transporters are designed to have a heavy lifting beam which can have a spherical socket to engage the spherical jack point of the airplane's main and nose gears. For these applications, two or more transporters are located under the main gear with a preferred similar engagement under the nose gear. The design of the transporter frames would be such that when driven into position, the transporter would snugly encapsulate the wheels of the aircraft landing gear. That snug positioning would align the spherical socket lifting points sufficiently with the spherical probe-type appendages of the landing gear. For these types of applications, a system that anticipates and corrects accumulative errors and variances is desirable. The steering system computers are very capable of evaluating and correcting inevitable minor variances that occur but, as in the case of the airplane landing gear strut, it is desirable to keep side loading to a minimum; and for this application, an extended, laterally restrained movement "positioning shaft" with a socket and probe 120 sit in a rigid mount socket recessed in the lifting beam structure 126. The positioning shaft is held in the center by a relatively dense, elastomeric, thick-walled sleeve 122. Electronic sensors are embedded or pass through sleeve 122 and contact positioning shaft 120. A radial force greater than anticipated or emanating from a direction not anticipated but detected at the top of shaft 120 by the sensors 124 provide "error" data to the computer from which corrective action is considered and initiated. The density of the elastomeric sleeve 122 provides the degree of latitude and time desired to evaluate the developing situation and take corrective action without the landing gear encountering an unacceptable side loading. The steering system can thereby keep each transporter exactly aligned under the center of the landing gear through any travel sequence as the transporters move the airplanes laterally, through rotate sequences, or through spontaneous or pre-planned random travel.

Thus, as can be seen, the present invention provides a relatively simple, yet reliable, means for transporting large, heavy and sometimes fragile loads by balancing the individual wheel set load, therefore accommodating uneven supporting surface.

What is claimed is:

1. A wheel module for use in transport devices, comprising:
    a pair of wheels mounted to a trunnion base;
    a cylinder with a vertical axis pivotably supporting said trunnion base;
    a piston fitting in said cylinder;
    an upper plate member for supporting a load;
    a vertical shaft connecting said piston to said upper plate member; and
    means for turning said cylinder about said vertical cylinder axis relative to said upper plate member.

2. A wheel module according to claim 1, wherein said cylinder has a closed end extending below axles supporting said wheels.

3. A wheel module according to claim 2, further comprising:
    means for introducing fluid under pressure to a chamber formed in said cylinder below said piston.

4. A wheel module according to claim 2, further comprising drive means for rotating each wheel in said pair of wheels.

5. A wheel module according to claim 2, further comprising:
    means arranged between said upper plate member and said vertical shaft for allowing said vertical shaft to rotate relative to said upper plate.

6. A wheel module according to claim 5, wherein said means for turning said cylinder about said cylinder axis comprises:
    means for coupling said cylinder to said vertical shaft connecting said piston to said upper plate member for rotation as a unit; and
    means for rotating said vertical shaft relative to said upper plate member for steering of said transport device.

* * * * *